Aug. 6, 1940.　　　　P. P. HORNI　　　　2,210,620
ELECTRIC SIGNALING APPARATUS
Filed June 15, 1936　　　9 Sheets-Sheet 1

INVENTOR
PAUL P. HORNI
BY
Pennie Davis Marvin & Edmonds
ATTORNEYS

Aug. 6, 1940.  P. P. HORNI  2,210,620
ELECTRIC SIGNALING APPARATUS
Filed June 15, 1936  9 Sheets-Sheet 2

INVENTOR
PAUL P. HORNI
BY
Pennie Davis Marvin & Edmonds
ATTORNEYS

Aug. 6, 1940.　　　　P. P. HORNI　　　　2,210,620
ELECTRIC SIGNALING APPARATUS
Filed June 15, 1936　　　　9 Sheets-Sheet 3

INVENTOR
PAUL P. HORNI
BY
Pennie Davis Marvin & Edmonds
ATTORNEYS

Aug. 6, 1940.  P. P. HORNI  2,210,620
ELECTRIC SIGNALING APPARATUS
Filed June 15, 1936  9 Sheets-Sheet 5

INVENTOR
PAUL P. HORNI
BY
Pennie Davis Marvin & Edmonds
ATTORNEYS

Aug. 6, 1940.  P. P. HORNI  2,210,620
ELECTRIC SIGNALING APPARATUS
Filed June 15, 1936  9 Sheets-Sheet 7

INVENTOR
PAUL P. HORNI
BY
Pennie Davis Marvin + Edmonds
ATTORNEYS

Aug. 6, 1940.    P. P. HORNI    2,210,620
ELECTRIC SIGNALING APPARATUS
Filed June 15, 1936    9 Sheets-Sheet 8

INVENTOR
PAUL P. HORNI
BY
Pennie Davis Marvin & Edmonds
ATTORNEYS

Aug. 6, 1940.                    P. P. HORNI                    2,210,620
                          ELECTRIC SIGNALING APPARATUS
                             Filed June 15, 1936                9 Sheets-Sheet 9

INVENTOR
PAUL P. HORNI
BY
Pennie Davis Marvin + Edmonds
ATTORNEYS

Patented Aug. 6, 1940

2,210,620

UNITED STATES PATENT OFFICE 2,210,620

ELECTRIC SIGNALING APPARATUS

Paul P. Horni, Newark, N. J.

Application June 15, 1936, Serial No. 85,311

6 Claims. (Cl. 177—361)

This invention pertains to signal transmitting mechanisms employed for formulating signals, and more particularly to improvements in signal formulating apparatus comprising a plurality of signal transmitters electrically connected with a central signal receiving station, such as a series of fire alarm or similar signaling boxes connected to a central office receiving station. Improvements are particularly afforded in signal transmitters commonly known as "interfering," "non-interfering," "non-interfering succession," "sector" and other types.

Heretofore in the art of signaling to which this invention applies it has always been the common practice, in the case of an open circuit occurring in the non-interference magnet coils, to provide mechanical means for the elmination of the defective winding from the signaling circuit, the loss of which destroys the non-interfering feature of the transmitter.

This invention provides purely electrical means to overcome this disadvantageous feature by permitting normal operation under this adverse condition, without the necessity of providing any mechanical functions for performing switching, shunting, shorting or other operations as heretofore required, and still retain the desirable non-interfering succession quality of the transmitter.

Extreme property loss and life depends not infrequently on the absolute dependability and rapidity of operation of fire alarm systems and their cooperative mechanical and electrical devices, and an important object of this invention provides means for the transmission of intelligences heretofore never known in the art of signaling, more particularly fire alarm signaling, namely, the utilization of undulating or carrier currents transmitted simultaneously with or independently of the normal unidirectional current to positively indicate at the central receiving station that an alarm box initiating means has been actuated. The signal initiating actuation causes an instantaneous indication at headquarters that an alarm box has been initiated, and, when the line is congested, the indication often is manifested at the central office, minutes before the actual reception of the conventional type of coded signal.

Furthermore, by employing a plurality of frequencies or tuned currents in conjunction with correspondingly tuned devices at the various stations, all of which is set forth more specifically in my co-pending application for a Signal system, Serial No. 85,312 filed even date herewith, it is possible to definitely identify the station actuated. For example, frequently when a plurality of stations are actuated simultaneously, if of the non-interfering succession type, one station takes precedence and sends through its signal, while the remaining station or stations must operate in "succession" with the consequent loss of priceless time, while with the non-interfering, non-succession type there is the possibility of the station being totally lost. Whereas, if the stations are of the interfering type, all boxes are lost. This invention eliminates the above defects and regardless of the normal mechanical and/or electric requirements of a series of simultaneously actuated stations, there will be an instantaneous signal manifestation at the central receiving station of each and every station actuated.

Experience has shown that much trouble is created in the signal alarm box due to corrosion of various electrical paths and contacts. While this condition is due in part to the varying weather and temperature changes to which the signal alarm box is subjected it is particularly true where the alarm boxes are installed in or near manufacturing plants, manholes, pedestal mounted boxes connected to underground systems, etc., which liberate various gases, which when combined with water present, due to the condensation caused by the variation in temperature between the inside and outside of the alarm signal box, form deleterious acids. These acids and fumes are positively known to cause extreme disability of the alarm box operations. Examples of this difficulty may be found in open coils, particularly of the tapper coil, associated gong, etc., which is in series with the line when the alarm signal box door is open. Trouble is also caused by corrosion of the spring forced contacts of the alarm box door shunt, which frequently fails to close the circuit, which naturally cuts in series with the signaling circuit, other devices which needlessly absorb energy, and further subjects the circuit to interruption by an open tapper coil, or the like.

This invention entirely eliminates the above objections by providing a non-inductive or low impedance path, which would prevent the disablement of the circuit for all currents including those of zero and varying frequencies, even though the tapper coil, the door shunt contacts, a non-interfering coil, and similar open circuit conditions are existent.

It has been noted in all commercial apparatus characterized in the general class of signal alarms, that when an open circuit occurred in the tapper coil of the sector type of alarm box, or in the noninterference magnet and/or the tapper coil, in the non-interference succession type of box, the true metallic loop circuit was open, and in order for a signal to get through to headquarters it was necessary to provide a common return, as a ground, to complete the circuit. This is not necessary in the present invention which entirely eliminates the defects of an inoperative circuit caused by an opening in a coil of any nature, due to the presence in the circuit of a plurality of non-inductive elements or units, frequently, serially connected with other units providing non-inductive and/or low impedance paths.

It is highly desirable, in apparatus of the class to which this invention pertains, to provide means for efficient telephonic communication over the regular alarm loop circuit. While this has been attempted in the past, there has never been any reasonable degree of assurance that the telephone communication would be established, and if it was established, there was always the frequent occurrence that the speech was so muffled and distorted as to be unintelligible. Specific requests and demands are constantly coming in to headquarters from fire chiefs on location of the fire, demanding various pieces of equipment and emeregency needs. Because of the usual unreliability of their own telephone equipment, it is frequently necessary for the fire chief to locate other telephone service, which not infrequently is far-distant from the alarm box. This unreliability is due in part to the superimposition of noises from adjacent lines often located within the same cable as the fire alarm loop. Therefore, the equipment, so necessary in telephone communication, must be highly efficient to offset the lack of line transposition for the reduction of undesirable noises.

Further, a defective movement shunt which is common in fire alarm practice, would place the non-interference magnets in series with the line, which magnets are in fact impedances and will straighten out the ripple of a telephone speech wave. This same condition occurs when an alarm box door is left open for testing, or for any other reason, such as a poor door shunt contact, which would place the impedance of the tapper coil serially in the circuit to destroy the effects of the speech wave.

Therefore, an object of this invention is to provide non-inductive paths which not only prevent the disruption of the normal loop circuit due to an open coil, but also eliminates the destruction of a normal speech wave by removing the undesirable impedance effectiveness.

It is a common fallacy of the transmitter mechanisms heretofore known to cause the "loss of a box" due to the failure of the mechanism to start when it is "pulled," because of a broken main spring in the spring motor, failure to rewind the spring motor, disabled lever springs, clogged gears, sticky or corroded levers, loose code wheel, undue friction on the code wheel rider, or any other possible disabling mechanical defect. In these cases, the signal could never reach the central receiving station, and ultimately the message of distress would either be communicated by telephone, or by messenger.

Contemplating the elimination of these innumerable defects this invention positively prevents the "loss of a box" due to mechanical defects in the transmitter mechanism, and once the alarm box starting or initiating lever is actuated, though the lever is not moved far enough to release the spring motor holding means, nevertheless, an instantaneous signal is communicated to the central receiving station.

In the patent to F. W. Cole, #1,058,728, and many other patents, the art shows it is old to establish a telegraphic communication over one side of the metallic loop or line, and a ground, as an emergncy circuit in case of a mal-condition of the regular line. Once the emergency circuit is established, the transmitter mechanism again proceeds to seize the line in an attempt to reach the central station. After a wasteful delay of precious time in an emergency, the initiating station eventually contacts the central receiving station.

It is clearly obvious that time is of the greatest importance when a fire or emergency alarm of any nature is "pulled," and that the delay of a few seconds between the initiating station's first try to seize the line and the ultimate transmission of the signal, may control the fate of many human lives, a definite example being to avoid disaster of ships at sea, due to slow signal manifestation or absolute failure of coded signal alarm.

While this invention may be used, and is here expressly shown in conjunction with an improved transmitting mechanism of the conventional type, it may be used in part without the spring motor. Realizing the great importance of instantaneous alarm, one of the objects of this invention is to provide an instantaneous signal transmitter by utilizing a current establishing means coacting with the alarm box initiating lever.

This invention may be adapted to any of the commercial devices of this general character in use today, and in particular may be utilized to increase the dependability on any of the usual direct current, or non-interference alarm boxes now in use. Furthermore, this invention in part may be used on any of the existing alarm signal boxes, for the purpose of establishing an instantaneous manifestation at headquarters of any individual initiating station or group of stations, and also may be utilized on any of the alarm boxes employing non-interference magnets, for the purpose of increasing the efficiency of the speech wave distorted by impedances in the circuit of the alarm box unit.

In a further aspect the invention provides means for making test operations to differentiate between a busy condition of a circuit, and a circuit defective per se, and thereafter establish means for conserving energy in the spring motor if the line is busy and successive operation is necessary, and/or for switching from the normal circuit to an auxiliary circuit, should certain mal-conditions exist, such as abnormally low current due to grounds or shunts and the like, or no current such as opens.

An object of this invention is to provide a signal of distinctive frequency characteristics permitting said signals to be received separately from the usual direct current signal, regardless of the path used for the transmission of such conventional unidirectional signal.

A further object is to provide positive operation of signal transmitting mechanisms and prevent the failure thereof due to an open coil in the non-interference magnet by establishing a non-inductive electrical path to complete the circuit.

Another object is to provide means for telegraphic communication by establishing a circuit between one side of the regular metallic loop, and a third conductor, for the purpose of transmitting an independent instantaneous general tell-tale signal indicating that at least one alarm station has been initiated, and/or for the purpose of communicating a second signal manifestation, the instantaneous manifestation being operative substantially concurrently with the conventionally actuated signal.

More particular and further objects are to provide a signal manifestation means entirely independent of the conventional transmitter mechanism motivating means and its necessary operative members; to establish return paths for a plurality of undulating or carrier currents, whereby signals may be transmitted without establishing any connection which would impair the operation of the unidirectional current, which impairment would occur in the event that a direct metallic connection between the direct current circuit and said return path should become established; to provide a filter, preferably selective, for passing a frequency or series of frequencies, and a by-pass therefor adapted to pass currents other than those responsive to the first named filter for operating various manifestation and/or other devices; to provide a normally closed alarm circuit having a plurality of currents which may be undulating or carrier currents, in conjunction with a current of a zero frequency, and means for interrupting said zero frequency current at one of several locations without disrupting flow of the remaining undulating or carrier currents; the provision of a single manual circuit interrupting means independent of the transmitter mechanism which may by a single operation transmit substantially concurrently currents of a plurality of distinctive characteristics; the provision of an auxiliary circuit interrupter for transmitting signals from either side of a metallic loop to a common return circuit; to provide a plurality of independent armatures responsive jointly or severally to the influence of more than one electro-magnet, connected serially or otherwise, so correlated that should one electro-magnet become ineffective the circuit would nevertheless remain operative, without introduction of any mechanism; to provide a plurality of independent electro-magnetic responsive armatures so disposed to effect under given conditions, a safety lock-out.

Other and further objects and advantages of the invention will be hereinafter set forth and the novel features thereof defined by the appended claims.

For a better understanding of the invention reference may be had to the accompanying drawings, in which.

Figure 1:
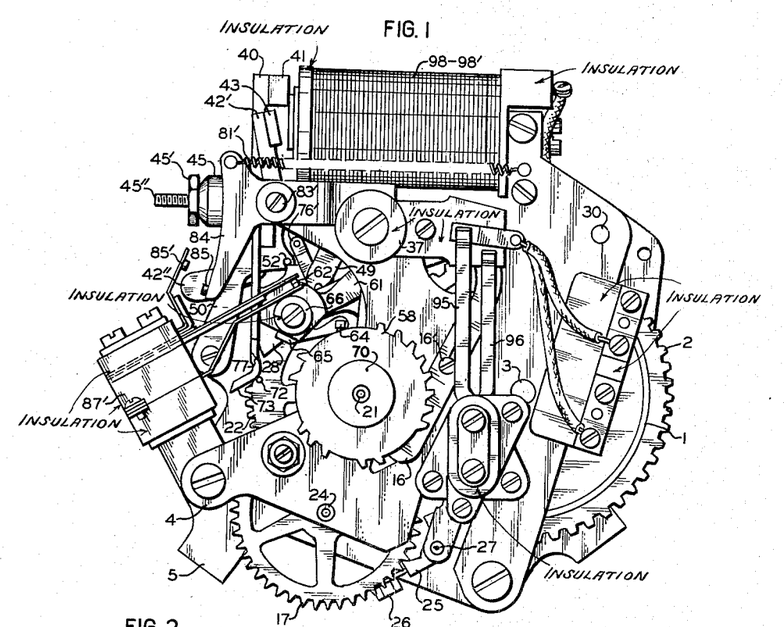
Fig. 1 is a front elevation of the complete movement conforming to the improved signal transmitting apparatus in accordance with the present invention, certain of the electrical conductors being omitted.
Figure 3:
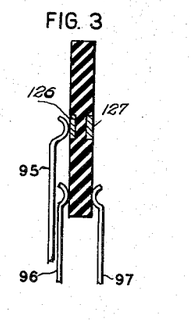
Figs. 3 and 4 are end sectional views of the pull lever switch and associated contacts.
Figure 4:
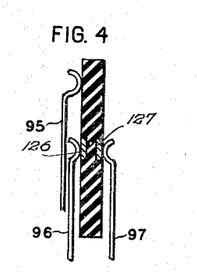

The front elevational view of Fig. 1, discloses generally the entire assembly of the "movement." The views shown in Figs. 3 and 4, have certain electrical parts removed to facilitate comprehension of the operation, and present clearly the relative positioning of the members which are shown in a normal position prior to starting the movement preparatory for transmission of signals as contemplated generally by this novel invention. The various elements comprising these views will be hereinafter more clearly set forth in detail.

Herein, certain aspects are not always extensively detailed, except where such parts have a definite bearing on mechanisms more particularly representative of the present invention. It is to be understood that various features of this invention may be utilized with other mechanisms and devices than those herein disclosed, and that portions and various aspects comprising less than the entirety of this invention may be employed separately or in groups.

Spring motor and gear train

Figure 5:
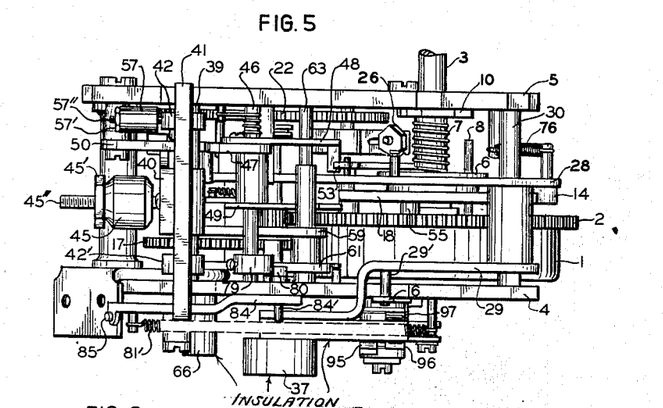
Fig. 5 is a plan view of the transmitter assembly with the coils, coil mounting bracket, and contact spring assembly removed.
Figures 6, 7:
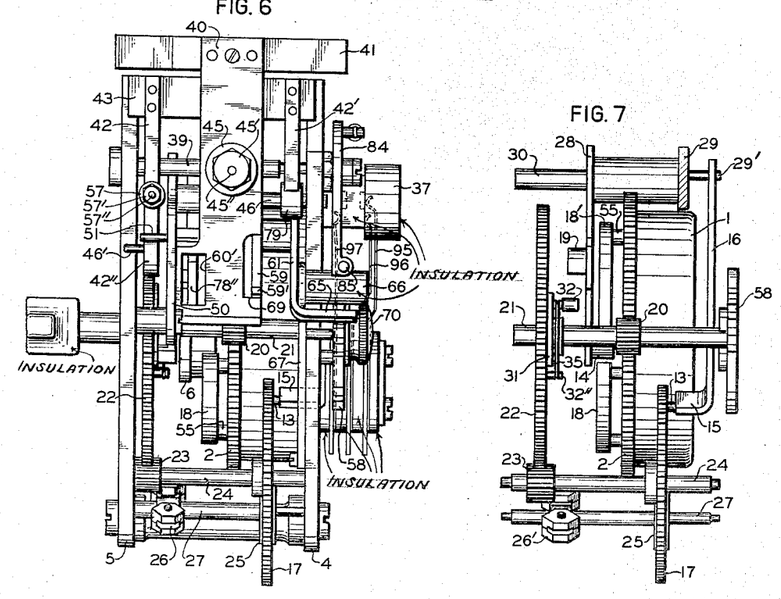
Fig. 6 is a side elevational view of Fig. 5 looking from the left, with a frame spacing strut and the spring assembly mounting bracket omitted.
Fig. 7 is a side elevational view, looking from the left, showing the motor and gear-train with associated control and locking mechanisms.
Figure 12:
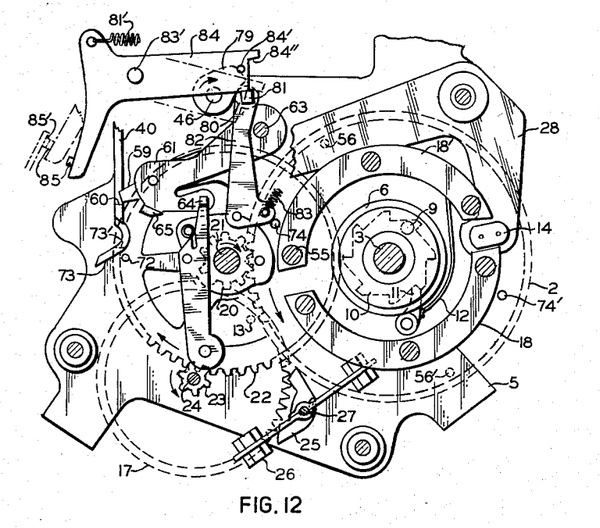
Fig. 12 is a front sectional view of the gear train, common return switching arrangement, and code wheel sender and associated locking devices.

The spring motor and gear train proper is similar to those well known in the art and is combined with improvements in this invention, particularly as to the gear train control and locking arrangement. Referring to Figures 12 and 7, more particularly to the former view, a barrel or bell 1, which houses the main spring, not shown, has a main spring gear 2, constituting a face or closure to protect the main spring from dust, moisture, etc., carried by a shaft 3, journaled in front and rear plates 4 and 5 (Fig. 5) respectively. One end of the main spring is secured to the shaft 3, and the other end is attached to the spring barrel in a conventional manner. A ratchet collet 6, threadedly moves on the screw 7 (Fig. 5) and is permitted axial movement by sliding on a pin 8, secured to the main gear plate, through an aperture 9, in the ratchet collet, when the shaft thread 7, is turned counter-clockwise to wind up the main spring. The collet arrangement permits the main spring to receive the proper tension to perform the desired results, and also to prevent breakage of the spring due to overwinding. A leaf spring 12, holds a pawl 11, in engagement with a ratchet 10, to prevent the spring winding shaft from turning in a clockwise direction after winding the main spring.

When the pin 13, on the escape wheel 17, is released by the shoulder 15, of the gear train control arm 16, and the dog 14, is removed from between the rounds counting sectors 18—18', the main spring urges the main spring gear 2, in a counter-clockwise direction. The main gear engages the main gear pinion 20, which is fixed on the code wheel shaft 21, which shaft also has affixed thereon, an intermediate gear 22, which is rotated by the code wheel shaft in a clockwise direction. The intermediate gear pinion 23, secured to the escape wheel shaft 24, is rotated by the intermediate gear in a counter-clockwise direction. A pallet 25, and an adjustable governor 26, are affixed to a reciprocable shaft 27, which is actuated by the motor urged intermittent rotary motion of the escape wheel.

For a more comprehensive understanding of the operation of the electro-mechanical device involved herein, it is necessary to, at times, refer to various mechanical activities and/or electrical reactions as occurring at intervals in relation to beats of the gear train movement. A beat occurs each time a tooth of the escape wheel is released by either end of the pallet. Therefore by referring to beats, it is possible to establish definitely, the relative positions of any parts of the transmitter mechanism at a given beat.

Manual control and signal train locking mechanism

Figures 8, 9, 10:
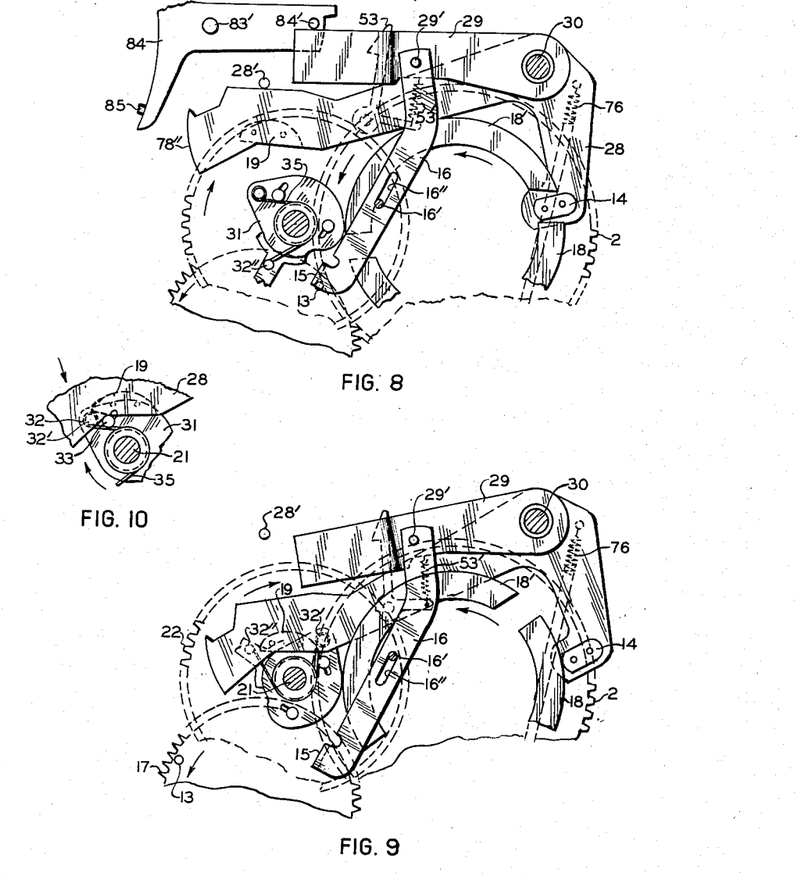
Figs. 8 and 9 are front elevational views to show particularly the arrangement of the initial and permanent locking devices of the gear train control mechanism.
Fig. 10 is a side elevational view of the initial locking device showing a cam impinging a roller of the moving pivot eccentric camming disc.

An initial, or preliminary locking means, is combined with a master locking mechanism to permit the signal train to be instantaneously locked in motion. Once the pull lever 29, is properly actuated, the initial locking means only controls the signal train motion until the master locking mechanism is positive in its operation. In Figs. 7 and 8 an operating lever, or bell crank 28, and a pull lever 29, are secured to a shaft 30, which is journaled in front and rear plates 4 and 5 respectively, to permit reciprocation of the shaft with its operating and pull levers. On the front of one end of the bell-crank is a dog 14, rigidly secured thereto, and on the back, near the opposite end of said crank is an operating lever cam 19.

Figure 11:
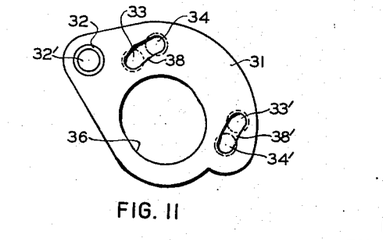
Fig. 11 is an enlarged front view of the camming disc shown in Fig. 10.

Figs. 8, 9, 10 and 11 show a moving pivot eccentric camming disc 31, having a roller 32 revolubly mounted on a stud 32' affixed to disc 31. Fig. 11 more clearly shows the code wheel shaft opening 36 to be slotted. A spiral twist spring 35 has one end secured to the roller stud 32', and the opposite end affixed on a stud 32", which stud is secured to a spoke of the intermediate gear. The twist spring 35 urges the camming disc in a clockwise direction.

Figure 21:
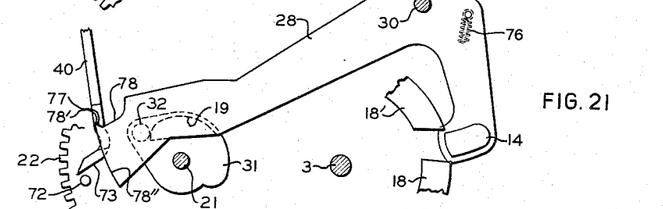
Figure 22:
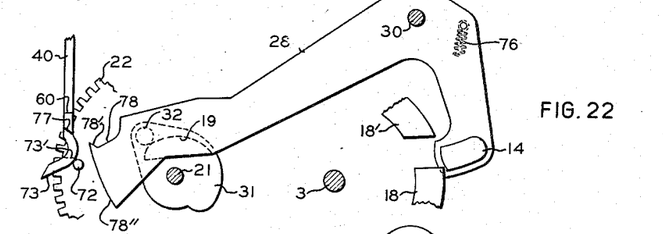

In operation, when the box is pulled, the pull lever roller 37 (Fig. 5) which is mounted on a stud secured to the pull lever 29, is moved downward rotating shaft 30, counter-clockwise. The operating lever cam 19 impinges the roller 32, forcing it and the disc 31, counter-clockwise. Fig. 11 shows the relative movement of the disc in relation to the pins 33—33'. The leading edge of the cam 19 (Fig. 10) forces the disc 31, on the code wheel shaft 21, in such manner that pins 33—33' ride in camming guides 38—38', to positions 34—34', at which time the leading edge of the operating lever cam is snapped below the roller 32, which roller is now forced by the twist spring to assume a position riding on the upper surface of cam 19, above the leading edge. The operating lever is now temporarily locked, and simultaneously therewith, the dog 14, mounted on the bell crank 28, is moved outwardly from its position intermediate the ends of the rounds counting sectors 18—18', to a position as shown in Fig. 21. Substantially simultaneously with the locking of the cam operating lever, the gear train control arm 16, pivotally mounted on a pin 29', which arm has a guide slot 16" therein, moves downward to a position as shown in Fig. 9, whereby the escape wheel pin 13 is freed from the control arm protuberance 15, releasing the escape wheel and permitting the gear train to be set in motion.

The pin 72 (Fig. 12) mounted on the front of the intermediate gear, substantially engages the bottom surface of the camming arm 73, when the gear train is started, and slidingly holds the arm 73 from 3 to 5 beats until the electromagnet becomes effectively energized. If the circuit is open to prevent energization thereof, the pin 72 then slides above and off the shoulder 73', permitting the armature 41 to fall back, which allows the movement to preliminarily operate non-interference succession, to be hereinafter more fully explained.

Figure 17:
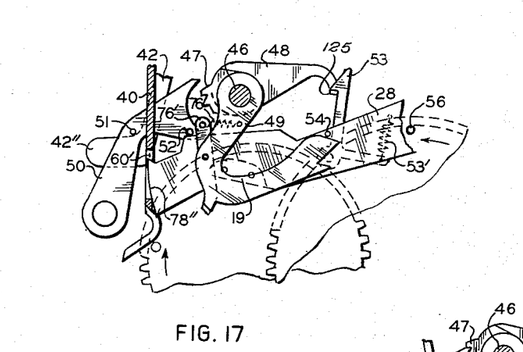
Figs. 17, 18 and 19 are front elevational views showing different steps in operation of the succession prolonging mechanism.
Figure 20:
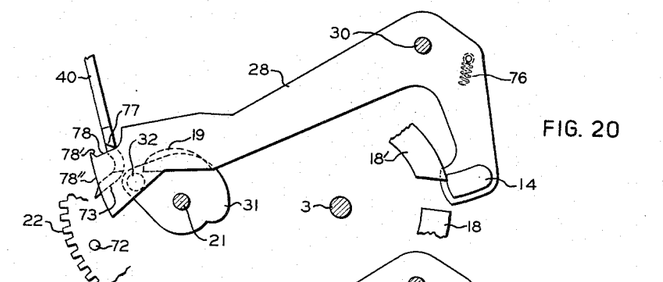
Figs. 20, 21, 22 and 23 are views representing successive steps of operation during the "feel-in" period.

After the transmitter has completed sending its cycle of coded signals, the locking lever 59 (Fig. 14) is down and mechanically locks the armature in its portative position, while the circuit controlling contacts are open and the electromagnet thereby deenergized. The operating lever at this period has no mechanical obstruction to prevent its restoration to normal, the dog of which is riding a rounds counting sector, substantially as shown in Fig. 20. The tension of the normalizing spring 76 urges the dog downward, and when the edge of sector 18' is reached, said dog slips intermediate the ends of sector 18—18', permitting the operating lever to restore to normal. The camming surface 78", of the operating lever, Fig. 17, finally rests in the bracket aperture 60', a point of said camming surface impinges a ledge on the bottom of the bracket aperture, and normalizes the stop lever 50, by contact with the pin 52. The train control arm 16 moves upward, so that the shoulder 15 of said arm is in the path of the escape wheel pin, to thereby effect cessation of the gear train and ultimate normalization of the movement. The upward movement of the bell crank being controlled by the frame mounted limiting pin 28'.

*Succession prolonging assembly and operation*

Figure 26:
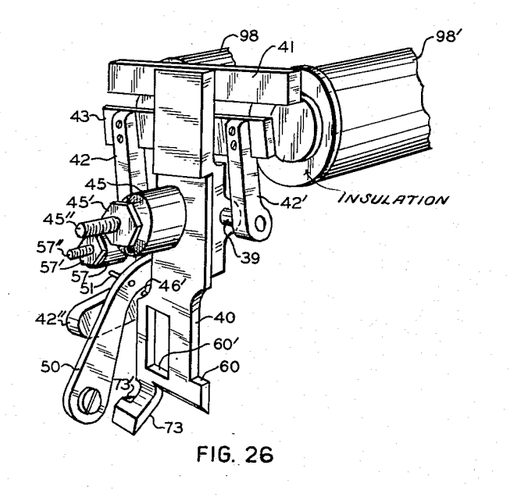
Fig. 26 is a perspective view of the dual armatures and other related parts.

The dual armatures, shown in perspective in Fig. 26, in relative position to the magnet and other parts can be best understood in conjunction with Fig. 6, wherein a shaft 39, journaled in plates 4 and 5, is rigidly secured to the non-interference armature bracket 40, having secured to one end thereof a non-interference armature 41. Pivotally mounted on shaft 39, are succession prolonging armature brackets 42—42', bracket 42 having a gravity balance extension 42'', and rigidly secured to one end of each of said brackets is a succession prolonging armature 43. The bracket 42 has an adjustable weight 57, and a lock-nut 57', on a screw 57'', to permit nicety of balance of the bracket for efficient operation responsive to the electromagnets 98—98'.

Figure 23:
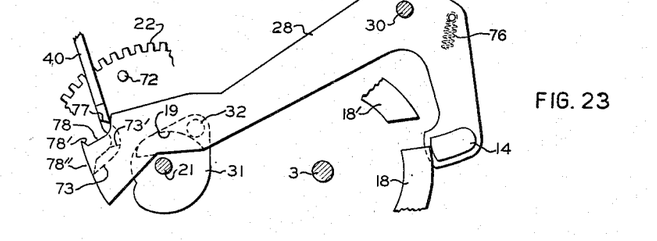

A gravity balance adjusting weight 45, having a locknut 45', is threadedly mounted on a screw 45'', affixed to the non-interference armature bracket. Secured to the gravity balance bracket extension 42'', is a limiting pin 46', which abuts the plate 5, and prevents the armature 43, from dropping back out of the area of efficient electromagnetic control. The non-interference armature 41, is free to, at times, drop back out of the area of efficient electromagnetic control to a position where the lower end of its bracket is similar to that shown in Fig. 23.

Figure 18:
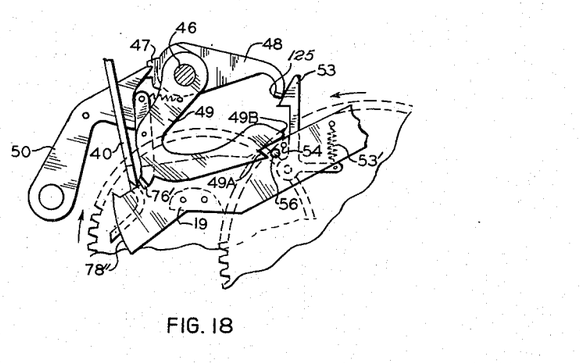
Figure 27:
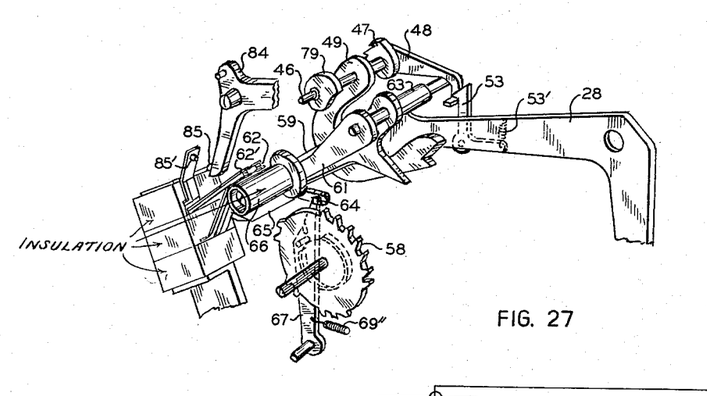
Fig. 27 is a perspective view showing arrangement of parts of the succession prolonging mechanism in relation to the code wheel, code wheel sender, and contact assembly.

The succession prolonging assembly is partly shown in perspective, Fig. 27, having a shaft 46, arranged to be pivotally mounted in the front and rear plates 4 and 5 respectively. The shaft has securely affixed thereon, a stop ratchet 47, an actuating arm 48, and a segment 49. A spring actuated "take-up" lever 76' (Fig. 19) is pivotally mounted on the segment 49, to at times engage the back of the bracket 42, and create a slight resilient pressure thereon to relieve rigid mechanical friction between the respective contacting surfaces. A stop lever 50, is pivotally mounted on the inside of the rear plate 5, Fig. 6, said stop lever having a pin 51, which extends in front of the lower portion of the bracket 42, to at times be actuated thereby, when the succession prolonging armature 43, is attracted by the electromagnet. A limiting pin 52 (Fig. 17) extends from the front of the stop lever in the path of the operating lever 28, to raise said lever 50 when the transmitter has completed operating and is restored to normal. Normal position of the members comprising the succession prolonging assembly is clearly shown in Fig. 17, wherein an actuating latch 53, is pivotally mounted on the operating lever and is urged forward by a spring 53', against a limiting pin 54. The latch 53 engages a hooked projection 125 on the actuating arm 48, and when the transmitter is actuated, and the operating lever is moved downward, the free end of the stop lever is permitted to drop against the ratchet 47, while the latch rotates the shaft 46, permitting the stop lever to engage the first tooth of the ratchet 47, as shown in Fig. 18. While the armature bracket extension 40, is shown in this view dropped back, due to the deenergized magnet, it is pointed out that the stop lever is actuated by the succession prolonging, or impulse armature bracket 42 only, and is never controlled by the noninterference armature bracket.

Two arcuate members, or rounds counting sectors 18—18' (Fig. 12) are mounted on studs, as 55, and thereby secured to the rear of the main gear, or main spring closure 2. Two segment actuating pins 56—56' are also mounted on the rear of said spring closure, as shown dotted in Fig. 12.

If a transmitter is actuated while the signaling loop is busy transmitting a signal from another signal initiating station, or "successful" box, the current impulses created by the successful transmitter or box, will periodically energize the electromagnets 98—98', of the waiting box, since the magnets in the various boxes are all serially connected into the signaling loop. It will be seen from Figs. 17 and 26, as heretofore explained, that a current flow capable of energizing the electromagnet to attract the impulse armature will cause said armature bracket to impinge the pin 51 on the stop lever 50, and disengage the free end of said lever from the stop ratchet. A twist spring (not shown) has one end connected to a pin on the rear plate 5, and the other end secured to the stop ratchet to urge said ratchet and its carrying shaft 46, in a counter-clockwise direction, which returns the shaft and its secured parts to a normal position when the stop ratchet is released. It will be apparent that while operating current impulses from a "successful" box are actuating the armature 43, the stop lever will be kicked back at each impulse, and consequently return the shaft to normal at the first impulse thus preventing actuation of the shaft by the pin 56 (Fig. 18) which would ordinarily engage segment tooth 49A, causing said shaft to assume a position which mechanically locks the armature in a portative position.

The arcuate rounds counting member 18—18', support the dog 14, on their respective peripheral surfaces, each member or sector is capable of supporting the dog 14, during four complete rounds of the code wheel 58. The segment actuating pins 56—56', being oppositely disposed, and so located radially on the closure plate, that they come in the path of one or the other of the teeth on segment 49, depending on whether or not a current impulse from another transmitter has caused the ratchet to be restored to normal.

Figure 19:
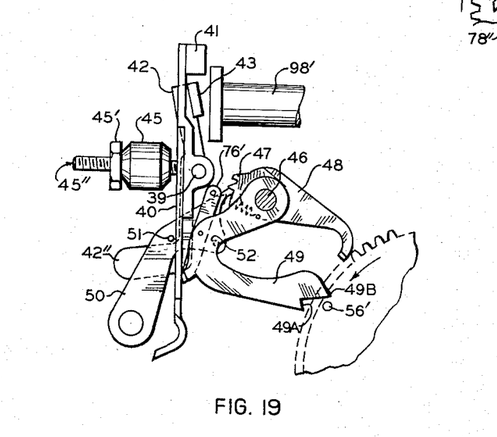

If during the first round of the code wheel no current impulse is received, the pin 56 (Fig. 18) impinges tooth 49A, and moves the segment 49 to a position as shown in Fig. 19, thereby causing the non-interference armature bracket to be mechanically locked in a portative position, at the end of the first round of the code wheel, freeing the non-interference armature bracket locking lever 59 (Fig. 13) from the shoulder 60, by moving same to the left, thereby permitting the code wheel rider 65 to drop on the code wheel 58, to be actuated thereby, and consequently operate its own circuit controlling contacts 62—62' (Fig. 27) over an auxiliary circuit, to transmit the three remaining code wheel rounds of the signaling cycle, the means for establishing the lectrical circuit to be later expalined.

*Code wheel and signal sender assembly*

The signal sender assembly, shown in perspective in Fig. 27, has a locking lever 59, and a sender arm 61, secured on a shaft 63, which shaft is pivotally mounted in front and rear plates 4 and 5. The sender arm has an extension, carrying a limiting stud 64, and extending at right angles from said sender arm are a code wheel rider 65, and a pin mounted insulating member 66, which engages the lower contacts of 62—62' to actuate same. A code wheel camming lever 67 (Fig. 13) has a tension spring 69'', which normally holds the camming lever pin 67', in engagement with the hub 69, or collar 58', depending on the position of the break in said collar. The sender arm on shaft 63, is rocked upward by various cooperating member, and is gravity actuated in its return movement.

Figure 16:
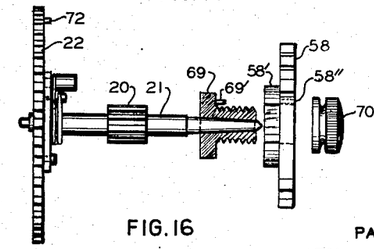
Fig. 16 is a view of the code wheel and its driving shaft.

Fig. 16 is a side view of the code wheel assembly which is mounted on a shaft 21, journaled in the front and rear frame plates 4 and 5. One end of the shaft is tapered to receive a hub 69, which is forced thereon. The code wheel has a collar 58', which fits over the hub, and a pin 69' secured in the hub engages an aperture 58'', in the code wheel to properly align the latter for the beat-timing of the signal train. A nut 70, threadedly secures the code wheel on the hub.

Figure 15:
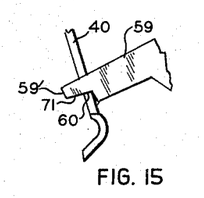

A pin 67' (Fig. 13) mounted on the rear of the camming lever, engages the hub 69 at which time the free end of said lever abuts the bottom of the limiting stud 64 to hold the locking lever end 59', above the shoulder 60, so that during deenergization of the magnet, the armature bracket 40, may fall back and assume the position shown in Fig. 15 during the preliminary period of operating non-interfering succession 15, prior to the emergency mechanical locking of the armature bracket 40.

Figure 13:
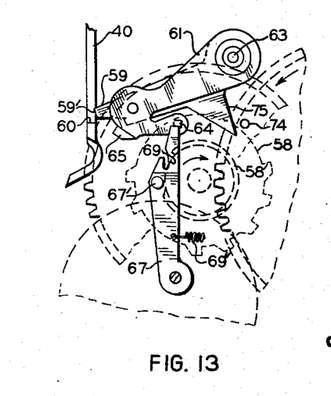
Fig. 13 is an elevational view showing the code wheel sender, and camming lever in relation to the code wheel.

After the gear train rotates the code wheel so that the periphery of its collar forces the pin 67' away from the hub, freeing the limiting stud, the sender arm is permitted to drop, which brings the code wheel riding edge of the rider 65, into engagement with the code wheel, the rider following the contour of the code wheel, and dropping into the interdental spaces thereof to actuate the circuit controlling contacts and formulate the particular station identification number of the transmitter.

Figure 14:
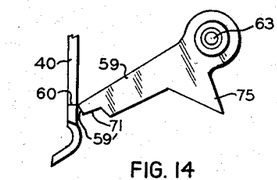
Figs. 14 and 15 are elevational views of an armature bracket, and bracket locking lever at different periods of operation.

Fig. 14 shows the locking lever 59 abutting the shoulder 60, which happens each time the rider edge drops into an interdental space of the code wheel. At this period the circuit controlling contacts are open and consequently the magnets are deenergized. This mechanical locking arrangement holds the non-interference armature in a portative position so that when the rider engages a code wheel tooth, to close the circuit and energize the non-interference magnet, the non-interference armature will be within the effective magnetic field to retain said armature in a portative position. If, when the locking lever is elevated free of the shoulder 60, the circuit should become open, the armature would drop back and move the shoulder under the ledge 71 (Fig. 15) preventing the sender arm from controlling the contacts 62—62', and the transmitter would then proceed to operate non-interfering succession. In operation, the circuit controlling contacts close from 2 to 3 beats ahead of the mechanical release, which affords the electromagnet ample time to become effectively energized.

Two pins 74—74' (Fig. 12) oppositely disposed on the front of the closure plate or main gear 2, are so positioned that they travel in the path of the apex end of the sender arm projection 75, to engage same. Either of said pins slightly elevates the sender arm for a period of from 4 to 6 beats to eliminate some strain on the gear train by friction between the ledge 71, and the shoulder 60, when the armature 41, is being urged to a portative position during the "feel in" period. After pin 74 or 74', as the case may be, releases projection 75, the sender arm limiting stud again rests on the top of the camming lever 67.

The busy test

Recapitulating, when there is no current on the signaling loop, which may be caused by current impulses from a "successful" transmitter, the bracket 40 (Fig. 15) drops back under the ledge 71 of the locking lever to prevent operation of the circuit controlling contacts. The bracket 40, also functions during the "feel in" period or "busy test" wherein periodic attempts are made by a waiting box to "seize" the line by urging the bracket 40, into a portative position that it might be retained there, should the magnet be energized in a normally closed circuit. If the dog 14, rides the periphery of sector 18', without successfully transmitting the box identifying signal, the "movement" will attempt to restore itself to normal, but the bracket cam rider 77 (Fig. 20) on bracket 40, is in the cam rider guide 78, and as the dog 14, slips off the end of the sector, and is urged inward by the normalizing spring 76, the cam rider slides forward in its guide abutting the protuberance 78', thereby holding the operating lever down, as shown in Fig. 21. Substantially simultaneously therewith, the roller 32, moving in a clockwise direction, begins to ride the operating lever cam 19, and in so doing draws downward slightly on the operating lever so that the protuberance 78' frees the cam rider Fig. 22, leaving said camming arm 73, in the path of pin 72, which pin engages said arm urging the bracket forward and putting the armature 41, in close proximity to the non-interference magnet core.

It will be noted that the relative positions of the members are now substantially the same as when the movement was originally initiated. If there is current in the circuit to energize the electromagnet, the armature will be magnetically locked, and proceed to transmit its signal as in normal operation. In the event the electromagnet is not energized, the armature will drop back, Fig. 23, and before the roller 32, leaves the operating lever cam 19, the sector 18 is rotated counter-clockwise, and urged under the dog 14, to maintain the signal train in operation for at least another four rounds of the code wheel. The segment actuating pin 56', then cooperates with its respective rounds counting sector to control the succession prolonging mechanism. The "feel in" period is cyclically recurrent until the transmitter successfully seizes the line.

Emergency switching

In the event the succession prolonging armature is not actuated during the first round of the code wheel, releasing the stop lever 50, from engagement with the ratchet 47, it is indicative that an abnormal open of the signaling circuit has occurred. It is therefore necessary to provide an auxiliary signaling path to permit the transmitter to send its signals to the central receiving station.

Secured to the shaft 46 (Fig. 18) and rotatable by action of the segment actuating pin 56, against the segment tooth 49A as the non-interference armature is urged against the electromagnet, is a rocker cam 79 (Fig. 12) which engages a cam roller 80. The cam roller has a stud 81, which is secured on a frame mounted pivotal stud arm 82, urged to the left by a tension spring 83. An emergency switch lever 84, pivotally mounted on the frame 4, by a pin 83' rests one of its ends on the stud 81. When the shaft 46, is rocked to a position as shown in Fig. 19, the rocker cam roller urges the stud 81, to the right free of the bottom of the switch lever, and under the tension of the emergency switch lever spring 81', said lever 84, is forced down until the switch lever ledge 84'', rests on top of the stud 81. The lever in this position has its contact 85, in engagement with a spring contact 85' which is mounted on the assembly shown dotted, and electrically insulated from the remaining springs (Fig. 24) said spring contact 85', being connected to a common return conductor as a ground. A pin 84' mounted on the switch lever 84 (Fig. 8) is in the path of the pull lever 29, which abuts the pin to restore the switch lever to normal upon cessation and normalization of the signal train.

Figure 24:
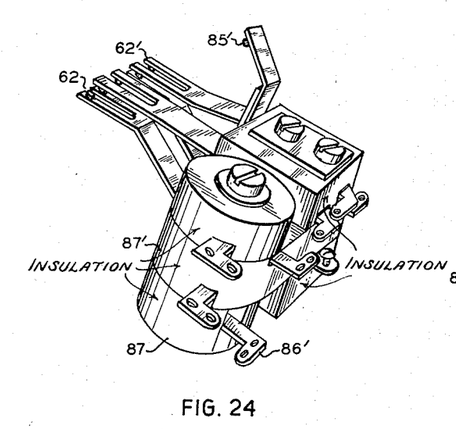
Fig. 24 is a perspective view of the contact spring and coil shunt assembly.
Figure 25:
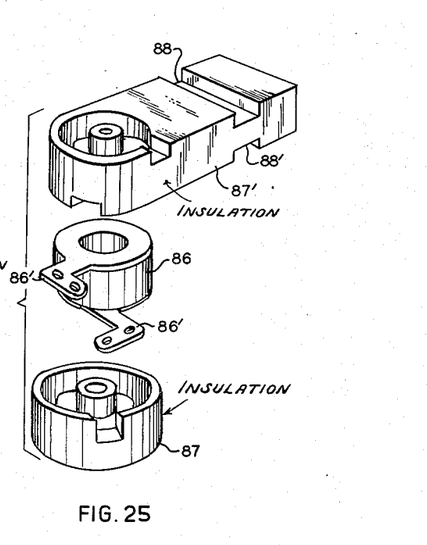
Fig. 25 is an exploded view of a portion of the coil shunt and its housing.

The perspective view Fig. 24, is the assembly of the circuit controlling and emergency switching contacts with housed carbon resistors or non-inductive shunts which are electrically connected in the circuit, said carbon resistors, shunting the electromagnets. Fig. 25 is a comprehensive exploded perspective view of a carbon spool 86, with electrical contacts 86' secured thereon, relatively positioned to the insulating housing 87—87', with locking grooves 88—88'. The current conducting springs are shown assembled, and it is to be understood that all parts are suitably insulated for electrical operation.

Recapitulating, an impulse from a successful transmitter will release the stop lever 50, from its engaging ratchet. If it should become necessary for the waiting box to thereafter signal over the auxiliary return conductor, the stop segment, in order to mechanically lock the non-interference armature in a portative position, must be moved by one segment actuating pin as 56', impinging the segment tooth 49A, and the opposite pin, later contacting tooth 49B, the last mentioned pin is shown in Fig. 19 just after moving the segment 49 into the position of mechanical armature locking for emergency signaling.

Figure 2:
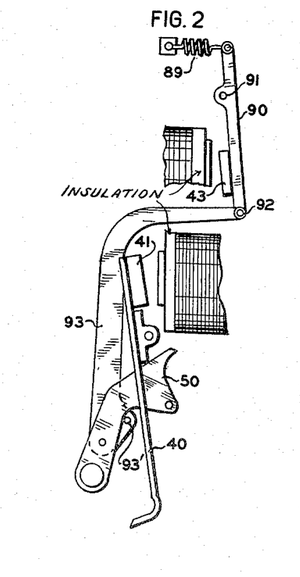
Fig. 2 is a modification of armature and stop lever arrangement.
Figure 29:
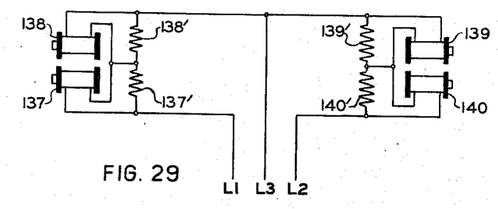
Fig. 29 is a simplified diagram showing connections to the coils and their respective shunts to comply with the modification as shown in Fig. 2.

The apparatus thus far has been described in cooperation with dual armatures acting in a single magnetic field, which affords various advantages. However, it is entirely feasible, and under certain service conditions desirable, to employ an independent magnetic field area for each of the armatures. Such an arrangement is shown in Fig. 2, wherein the armature 41, bracket 40, and lever 50, are similar to corresponding members heretofore explained. The succession prolonging armature is shown in a simple arrangement having the armature 43, normally disengaging its armature core under action of a tension spring 89 but the armature always remains within the effective magnetic area. The armature lever 90 is pivotally mounted on a pin 91, and opposite the spring attaching end is a pin 92, which pivotally connects the armature lever to an extension arm 93, carrying a pin 93', which when actuated upon energization of armature 43, causes pin 93' to kick out the stop lever of the succession prolonging assembly. An electrical circuit for connecting the coils and respective shunts in this arrangement may be seen in Fig. 29, wherein non-interference electromagnet unit 137—138, and respective shunts 137'—138', are connected with the succession prolonging or impulse electromagnet unit 139—140, and respective shunts 139'—140', said units being serially connected with each other into the lines L1—L2. A terminal intermediate the electromagnet units may connect, through the emergency switch, (not shown), to a common return L3. It is understood that the circuit controlling contacts, switches, filters and other parts explained in regards to the original views herein shown, would be suitably connected in the circuit in conformance with the objectives of this invention.

*Current energy sources*

Figures 30, 31:
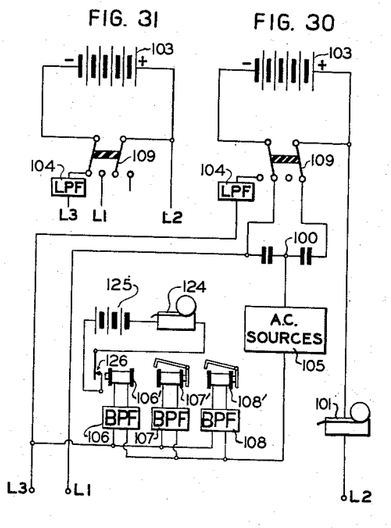
Fig. 30 is a schematic representation of central office equipment adaptable for use in conjunction with the present invention.
Fig. 31 is a different condition of the manually operated switch in Fig. 30.

The diagrammatic representation shown in Fig. 30, has a suitable direct current energy source, here shown as a battery 103, connected across the lines L1—L2, with a register 101, connected in one side of the line. Two filters, such as condensers, are shown connected across the line to a common terminal 100, which terminal is connected to a conductor having impressed thereon a multiplicity of suitable alternating currents of different and distinct frequencies, from a multi-frequency alternating current energy unit 105, the other side of said alternating current unit being suitably connected to selective band pass filters 106, 107 and 108, and corresponding manifestation devices 106', 107' and 108' respectively, a filter and manifestation device being supplied for each of said frequencies, and responsive thereto. The other sides of the filter-manifestation means are connected to a common return or line L3. In Fig. 31 the switch is shown in a position to meet emergency signaling requirements, when one side of the line, as L1, becomes abnormally open. Battery 103, is connected serially between the lines L3 and L2 to supply energy for direct current operation. A low pass filter 104, is inserted in the line to permit passage therethrough of direct current, and to prohibit passage of alternating current and a consequential detrimental shunting of the alternating current central office apparatus.

While the central office circuit is shown in a simplified form for manual operation, it is understood this is merely for explanatory purposes and may be changed, amplified and automatically controlled, as is more fully detailed in the aforementioned co-pending application for a signal system.

*Electrical apparatus and circuits*

Figure 28:
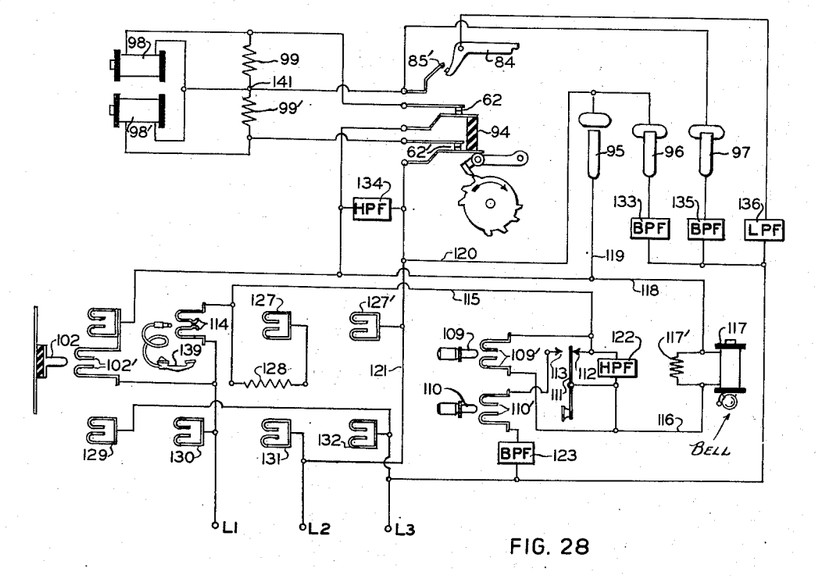
Fig. 28 is a diagrammatic representation of the complete transmitter wiring arrangement in relation to certain mechanical devices and other parts.

A typical diagrammatic representation of the complete electrical parts and connections therefor and certain cooperative members of a signal transmitting station or "box" are shown in Fig. 28. Circuit controlling contact sets 62—62' are shown with an insulating connector 94, arranged between one contact of each set, the joined contact springs pressing down on a pivotally mounted code wheel sender arm which is moved up and down in response to the contour of the toothed code wheel. A box shunt or switch 95, is shown open, while switches 96 and 97 shown closed, control circuits energized by alternating current. Non-interference magnet coils 98—98', are shunted by carbon spools 99—99' which may be any suitable non-inductive or low impedance shunts. An audible box signal manifestation device 117, here shown as an electromagnet to actuate a tapper bell, also has a carbon spool shunt, or by-pass 117'.

When the door of the box is closed, the door shunt 102 closes the circuit across the door shunt clips 102', and the manual telegraph signaling circuit is shunted out to reduce line resistance when the automatic transmitter controls the signaling circuit. The magnets 98—98' and their respective shunts are now serially connected in the signaling loop through contact sets 62—62' to the lines L1—L2.

Under conditions of an abnormal open circuit in the signaling loop, the emergency switch lever 84, engages a spring contact 83', setting up an auxiliary circuit, which may be traced from a terminal 141, intermediate the non-interference coils and their respective shunts, the opposite ends of which are circuitously connected to terminals of lines L1—L2, to a common return conductor L3.

Manual telegraph operation is obtained by opening the "box" door, and thereby removing the metallic door shunt 102, from its receiving contacts 102', and placing the manual operating means and manifestation device serially into the signaling circuit and with the non-interference magnets of the transmitter.

When the metallic bridging plugs 109 and 110 are not inserted in their respective clips 109' and 110', a circuit may be traced from line L1, through the closed telephone clip 114, conductor 115, key contact 112, key lever 111, conductor 116, tapper coil and shunt 117 and 117' respectively, conductors 118 and 119, box shunt 95, which is closed when the "movement" is not in operation, conductors 120 and 121 back to line L2. This arrangement permits control of transmitting direct current impulses for operating register 101 (Fig. 30).

To transmit a manual signal employing only alternating current, plug 110 is inserted in its clip 110', whereby a circuit may be traced from L1, 114, 115, through a high pass filter 122, lever 111, contact 113, when key knob is depressed, plug 110, and its clip 110', a selective filter 123, common return L3, to actuate relay 106' (Fig. 30) through filter 106 which controls the local battery circuit to actuate register 124, energized by battery 125 through contact set 126.

By inserting plugs 109 and 110 in their respective clips, both of the above operations will be manifest to actuate registers 101 and 124, and thereby transmit two coded signals at each complete operating cycle of the manually operated signaling key.

The telephone clips 114, permit the introduction therebetween of an instrument plug, such as is used for connecting serially into the line, a telephone hand set shown as 139.

The clips 127—127' permit a current conducting plug to be inserted thereacross to include in the circuit the resistor 128 for operating on "silent test," as is well known in the art. Clips 129 to 132 inclusive are used for shorting out the transmitter, or for connecting either side of the line to the common return.

*Normal operation*

Figure 32:
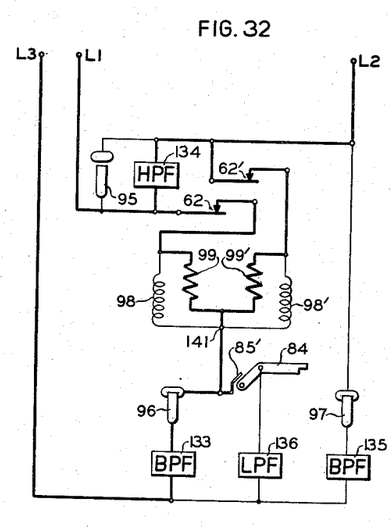
Figs. 32, 33 and 34 are diagrammatic representations of current paths in the signal transmitting unit when the circuit is closed through the door shunt switching device.
Figure 33:
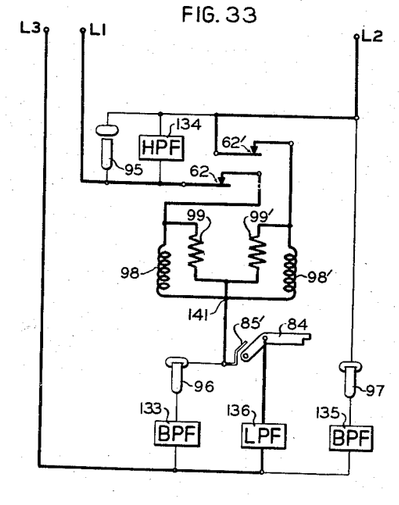
Figure 34:
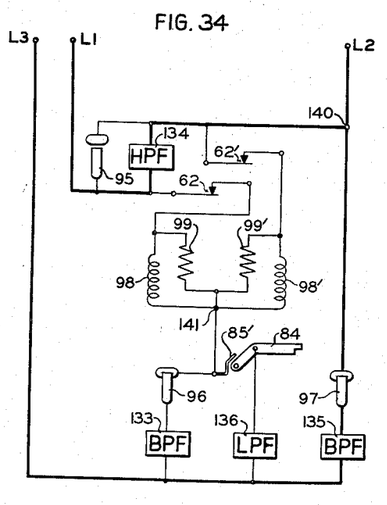

The electrical current path may be best traced by referring to the drawings in Figs. 32, 33 and 34, which represent similar electrical parts and connections in a transmitter as contemplated by this invention, when the box shunt 95, is open and the door shunt is closed. In each of the views, lines L1, L2 and L3 are disposed so as to be used in reference to similar line connections in Fig. 30, with the central office equipment.

Under normal line conditions when a box is actuated, three distinct signals are transmitted to the central receiving station. Switch contact 95 moves from the metal strip 127 on to the insulation forming a part of pull lever 29, thus opening the box shunt; and substantially simultaneously, switch contacts 96 and 97 are moved into engagement with the metal strips 127 and 126 to close circuits as shown in Figs. 28, 32, 33, 34.

A direct current circuit path, Fig. 33, may be traced from negative battery 103, over line L1, contact set 62, coil 98 and its shunt 99, to a terminal 141, through coil 98' and its shunt 99', contact set 62', line L2, register 101, back to positive battery. When the code wheel actuates the contact sets 62—62', the direct current will be interrupted to transmit the station identifying code number corresponding to the teeth on the code wheel and actuate register 101.

In Fig. 32 since the impedance of the magnets 98—98' is such as to be prohibitive to the passage of alternating current, none of the alternating current passes through the magnets, but does pass through the magnet shunts. Switch 96 being closed, one frequency selected from a plurality of frequencies, by the selective band pass filter 133, passes from one side of the central office alternating current source, over lines L1—L2, through contact sets 62—62', resistors or shunts 99—99', unite at terminal 141, passes through 96 and filter 133, over L3, filter 106, actuating relay 106', back to the other side of the alternating current energy source. It will thus be seen that each impulse of the code wheel circuit controlling contacts also controls an alternating current, to create a coded signal on the register 124, the initial impulsing current frequency of which is common to all transmitters in the particular loop circuit and may be utilized by any "successful" transmitter.

A high pass filter 134 is connected across each box shunt switch to provide alternating current circuit continuity to any "waiting" box, during operation of any "successful" transmitter to transmit an instantaneous signal. In Fig. 34, when the box is actuated, an instantaneous uncoded signal is received at headquarters, before the conventional coded signal, regardless of whether or not the signaling loop is busy. Each transmitter has a selective filter 135, and an independent manifestation device and corresponding selective filter, two sets of which are shown in Fig. 30, as 107'—107 and 108'—108 respectively, and an independent alternating current of a distinctive frequency for each of said selective filter sets, originating in 105. Therefore, in Fig. 34 a current path may be traced from the alternating current energy source, over L1—L2, to the signaling loop connection 140 in the transmitter, to switch 97, selective filter 135, L3, back to the alternating current energy source.

*Emergency operation*

An abnormal open circuit in the loop would cause the transmitter movement, as heretofore set forth, to actuate switch 84, Fig. 33, and close a circuit between said switch and a contact 85'. Assume the abnormal open circuit occurred in the L1 side of the line. The switch 109 would then be changed automatically, or by a headquarters attendant, to the position shown in Fig. 31, whereby a direct current circuit path may be traced from positive battery, through register 101, line L2, contact set 62', magnet and shunt 98'—99' respectively, terminal 141, contact 85', switch 84, low pass filter 136 which is prohibitive to passage of alternating current but passes direct current over L3, back to negative battery. A low pass filter 104, is also shown in L3 in the central office apparatus, to prevent passage of alternating current. The electromagnet 98' is so constituted as to permit normal operation on its single coil, the impulsing of contact set 62' would also interrupt an alternating current flow to effect actuation of register 124. The instantaneous uncoded signal would be received normally as heretofore described.

It will be seen that when the common return is utilized for direct current signaling, there are also two alternating current signals transmitted as in normal operation.

By providing non-inductive shunting members for each magnet, the effective inductance of each parallel combination is substantially eliminated. Thus, if several transmitters are actuated at substantially the same instant, the contacts of the successful transmitter must make and break current in a circuit in which the magnets of all the waiting transmitters are serially connected. This added inductance, in the signaling path tends to hasten the deterioration of the signaling contacts, since the energy stored in all magnets must be dissipated in the form of an arc occurring at each separation of the cooperating signaling contacts. The shunting members, as herein disclosed, provide suitable and convenient means for absorbing this energy of self-inductance and thus increase contact life.

At each closure of the signaling contacts, the battery voltage is opposed by a counter electromotive force of self-inductance and the current gradually rises to a final value $i_0$ which is equal to $$\frac{e}{r}$$

where $e$ is the voltage of the battery and $r$ is the total resistance of the circuit. The current $i$ at any instant may be expressed:

$$i = i_0(1 - \epsilon^{-tr/L})$$

where $\epsilon$ represents the base of natural logarithms, $t$ represents the elapsed time from the instant of closure of the contacts, $r$ represents the total resistance in the circuit limiting the final current value $i_0$, and L represents the total effective inductance in the circuit. From this equation, the importance of the ratio $$\frac{L}{r}$$

will be seen since the time required for the current to attain only one-half of its final value will be:

$$t\frac{1}{2} = .6931\frac{L}{r}$$

seconds, and the time to attain ¾ of the final value will be:

$$t\frac{3}{4} = 1.3862\frac{L}{r}$$

seconds, where L is the total effective inductance of the circuit in henrys and $r$ is the total resistance in ohms which limits the flow of current after the steady state has been reached.

In the construction of all transmitters of the positive non-interfering type, a definite time interval elapses between the instant of closure of the signaling contacts and the instant that mechanical support is withdrawn from the non-interference armature. This action takes place as the contacts are closed by the sloping edge of each tooth on the code wheel. No such time interval is included or required when the contacts open since the overlapping action of the mechanism insures mechanical support for the armature prior to the opening of the contacts.

Thus, it will be seen that any successful transmitter must not only make and break the current flowing through all magnets in the circuit, but it must also include a period of overlap so that the current will attain a sufficient value to retain the non-interference armature in its portative position before mechanical support is withdrawn. If mechanical support should be withdrawn before sufficient electrical support is substituted therefor, the non-interference armature will drop back to its unattracted position and the transmitter will forfeit its control of the circuit.

Thus, if several transmitters are actuated simultaneously, or substantially so, each upon actuation introducing its noninterference magnets serially into the circuit, a condition may occur whereby no signal will be received from some of them. Upon actuation, each transmitter includes its magnets in the series circuit connecting the several transmitters, thus increasing both the inductance and the resistance for the entire circuit. The introduction of the resistance reduces the final value of current, $i_0$, which will flow upon reaching the steady state. If the ratio, $$\frac{L}{r}$$

is greater for the transmitter magnets than for the entire circuit, it will decrease the rate of current change when the signaling contacts close, and the combined retarding effect of several such magnets may in many cases be sufficient to delay the flow of current required to hold the non-interference armature of the successful transmitter in its portative position until after removal of mechanical support from said armature and its lapse into the unattracted position. Another of the transmitters, attempting to seize the line and transmit its signal, will in turn be similarly unsuccessful if its period of overlapping action is no longer than that of the first transmitter. Thus, all of a group of transmitters will be unable to transmit their signals because of the excessive inductance in the circuit. It is probable, that after a considerable delay, during which certain transmitters will complete their cycles of operation and will have come to rest, shunting out their magnets, one or more of the group may succeed in transmitting their signals, but several signals will have been unnecessarily lost.

The provision of shunting members as described greatly reduces the effectiveness of the self-inductance of the magnets by permitting current to flow through the shunting members substantially instantaneously. Thus the presence of a plurality of non-interference magnets in the series circuit, introduced either by faulty contact at the movement shunts or by actuation of the respective transmitters, will exert no harmful degree of retarding action upon the flow of signaling current.

These non-inductive shunting members have the further advantage of permitting the flow of heavy current surges, which may be induced by lightning or by adjacent power circuits, without damage to the magnets or the insulation of the system which would otherwise be caused by the extremely high voltages of self-induction accompanying rapid changes in current.

From the foregoing description, it will be noted that the resistor 128, Fig. 28, is provided for the "silent test," which permits a test of all transmitter functions without operating any manifesting devices associated with the normally closed direct current signaling circuit. Although the value of the "silent test" resistor is normally from 40 to 60 ohms, it could be equally effective, depending upon circuit conditions, if it were to have any value whatever within the general range from 20 to 500 ohms.

In considering operation of transmitters under such conditions as one or more transmitters being shunted out of the circuit, it has been customary to assume that the shunt has a negligible resistance so that no appreciable current flows through the non-interference magnets under the shunted condition. In actual practice using conventional apparatus, it is not uncommon for an abnormal shunt, caused by one of many possible conditions, to be placed across the signaling conductors of a transmitter initiating station, or at one or more points on the signaling loop, to the common return, as a ground, cable sheath, etc., wherein the resistance of such a shunting path may readily lie within the range from approximately 20 to 500 ohms and thus simulate the conditions obtaining under "silent test," whereby the transmitter mechanism operates in the normal manner without establishing emergency current paths, while the changes in line current at the central receiving station may be of insufficient magnitude to cause response of any of the conventional manifesting devices in the closed metallic circuit.

In the present invention, under the abnormal conditions expressed immediately above, two separate frequency selective current paths are established between the closed metallic circuit terminals and the common return terminal, and will cause actuation of suitable manifestation means at the central office independently of the current flowing in the normally closed direct current loop. One of these current paths is controlled by the box actuating lever and is used in obtaining a non-coded station identification, based on the selection of a certain frequency from a group constantly impressed upon the circuit. The other current path is controlled by the signaling contacts and may conveniently be used with a frequency common to all transmitters for the actuation of registers or any form of manifesting device suitable for use with signals comprising groups of spaced impulses.

Accordingly, it will be seen that this actual abnormal condition heretofore caused the box to be "lost," since its resultant operation is merely "silent test" without actuation of any central receiving station register, while in the present invention the regular circuit controlling contacts which are operated on direct current, will impulse an alternating current, preferably of carrier frequency, to thereby cause actuation of a central receiving station register of a normally coded signal.

The transmitter disclosed herein is shown connected to a circuit having an auxiliary return path, yet it is to be understood that the transmitter may be employed without the functions of the emergency switching means, for use on a system not provided with an auxiliary circuit return path, as a ground.

When signaling on a system equipped for transmission over a metallic loop only, in the event of both coils of the non-interfering magnets having an open circuit in their respective windings, the signal would be sent, but the non-interfering succession feature would be suspended. Since the protective shunts are permanently connected across the coils, the necessity of providing mechanical motions and switching means is entirely eliminated by this novel invention.

However, the possibility of both coils being open is an extremely rare condition which is further mitigated by the presence of the electromagnet protective by-pass members. Under the more common condition of only one coil becoming defective, the transmitter contemplated by this invention would present the desirable novel feature of operating non-interfering succession.

Not only do the permanently connected electromagnet by-pass members provide circuit continuity in the event of an open coil, or coils, for direct current operation, but, recapitulating, they provide a current path for telephone communication to maintain a normal speech wave; are protective means for line surges and excessive voltages; and afford excellent paths for alternating currents used in the coded signal, "silent test" and instantaneous signaling features.

Certain specific detailed features and advantages of the invention have been herein set forth, but the invention is not limited thereto, as changes and alterations may be and may become apparent to those skilled in the art without departing from the spirit thereof as defined by the appended claims.

Having thus described my invention, what I claim as new and desire to secure by Letters Patent of the United States is:

1. Signaling apparatus comprising terminals for connection to two sides of a signaling loop, a third terminal for connection to an emergency return line leading to a central station in the loop, impulse contacts connected between said first terminals, means for actuating the said contacts to alternately open and close the same, an electromagnet in series with the contacts, an armature cooperating with the electromagnet for controlling operation of said actuating means, the armature being moveable beyond the range of attraction of the electromagnet upon opening of the loop during closure of said contacts and thereby preventing operation of the contact actuating means, a mechanism for mechanically holding the armature in the range of attraction of the said electromagnet during opening of said contacts in the operation thereof, means responsive to opening of the loop for a predetermined time interval for positively moving and holding the armature in the range of attraction of said electromagnet, and means associated with said last means for connecting said contacts and electromagnet to the third terminal upon actuation of the armature moving means.

2. Signaling apparatus comprising terminals for connection to two sides of a signaling loop, a third terminal for connection to an emergency return line leading to a central station in the loop, impulse contacts connected between said first terminals, means for actuating the said contacts to alternately open and close the same, an electromagnet in series with the contacts, an armature cooperating with the electromagnet for controlling operation of said actuating means, the armature being moveable beyond the range of attraction of the electromagnet upon opening of the loop during closure of said contacts and thereby preventing operation of the contact actuating means, means responsive to opening of the loop for a predetermined time interval for positively moving and holding the armature in the range of attraction of said electromagnet, means associated with said last means for connecting the contacts and electromagnet to said third terminal upon actuation of the armature moving means, and means for releasing said armature holding means upon closure of said opening in the line.

3. Signaling apparatus comprising terminals for connection to two sides of a signaling loop, a third terminal for connection to an emergency return line leading to a central station in the loop, impulse contacts connected between said first terminals, means for actuating the said contacts to alternately open and close the same, an electromagnet in series with the contacts, an armature cooperating with the electromagnet for controlling operation of said actuating means, the armature being moveable from the influence of the electromagnet upon opening of the loop during closure of said contacts and thereby preventing operation of the contact actuating means, means responsive to opening of the loop for a predetermined time interval for positively moving and holding the armature in the influence of said electromagnet, means associated with said last means for connecting said contacts and electromagnet to the third terminal upon actuation of said armature moving means, a pilot armature permanently in the field of said electromagnet and adapted to assume an attracted and unattracted position with respect thereto, said pilot armature being attracted by the electromagnet from its unattracted position only in response to current flow through the electromagnet and both sides of the line, and means responsive to an attraction of said pilot armature for releasing the armature holding means and disconnecting the electromagnet and contacts from the third terminal.

4. Signaling apparatus comprising terminals for connection to two sides of a signaling loop, impulse contacts connected between said terminals, means for actuating the said contacts to alternately open and close the same, an electromagnet in series with the contacts, an armature cooperating with the electromagnet for controlling operation of said actuating means. the armature being movable from the influence of the electromagnet upon opening of the loop during closure of said contacts and thereby preventing operation of the contact actuating means, means responsive to opening of the loop for a predetermined time interval for positively moving and holding the armature within the effective influence of said electromagnet, a pilot armature permanently in the field of said electromagnet and adapted to assume an attracted and unattracted position with respect thereto, said pilot armature being attractable by the electromagnet from its unattracted position only in response to current flow through the electromagnet and both sides of the line, and means responsive to an attraction of said pilot armature for releasing the armature holding means.

5. Signaling apparatus comprising terminals for connection to two sides of a signaling loop, impulse contacts connected between said terminals, means for actuating the said contacts to alternately open and close the same, an electromagnet in series with the contacts, an armature cooperating with the electromagnet for controlling operation of said actuating means, the armature being movable from the influence of the electromagnet upon opening of the loop during closure of said contacts and preventing operation of the contact actuating means, means responsive to opening of the loop for a predetermined time interval for positively moving and holding the armature within the effective influence of said electromagnet, and a means responsive to current flow through the magnet for releasing the armature holding means.

6. In a signal transmitter of the non-interference and succession type comprising two pairs of serially connected contacts adapted for connection to a signaling line including a central station, an auxiliary conductor for connection to the central station, a signaling train, an electromagnet having a pair of windings and a non-interference armature associated therewith, the combination of a substantially non-inductive resistor shunting each of said windings and permitting operation thereof to actuate said armature, an auxiliary armature responsive to substantial energization of either or both of said windings, mechanical means actuated by the signaling train responsive to prolonged retracted positioning of the auxiliary armature during the running of said train to move said non-interference armature to its signaling position, latch means responsive to retracted positioning of the auxiliary armature to retain the non-interference armature in its signaling position, and switch means actuated by said mechanical means for establishing connection between said serially connected contacts and the auxiliary conductor.

PAUL P. HORNI.